Patented Nov. 17, 1925.

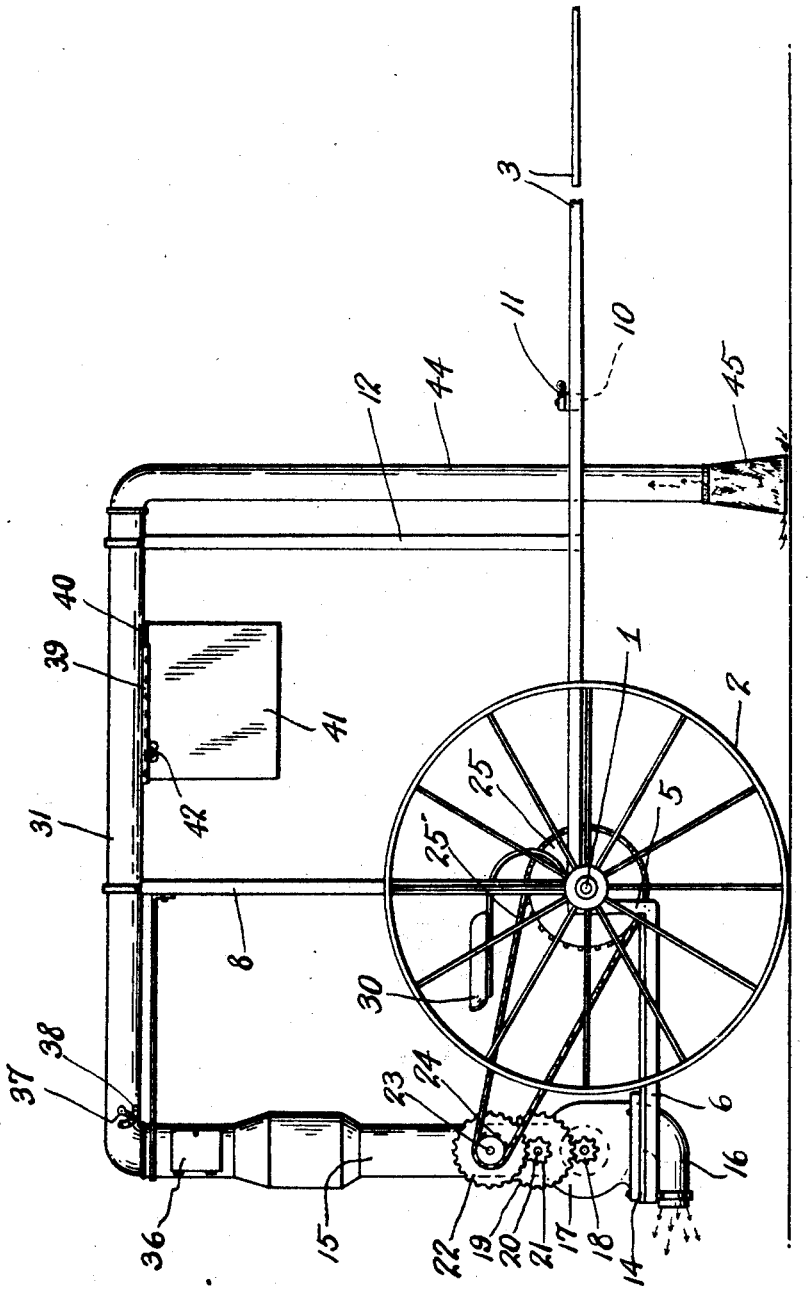

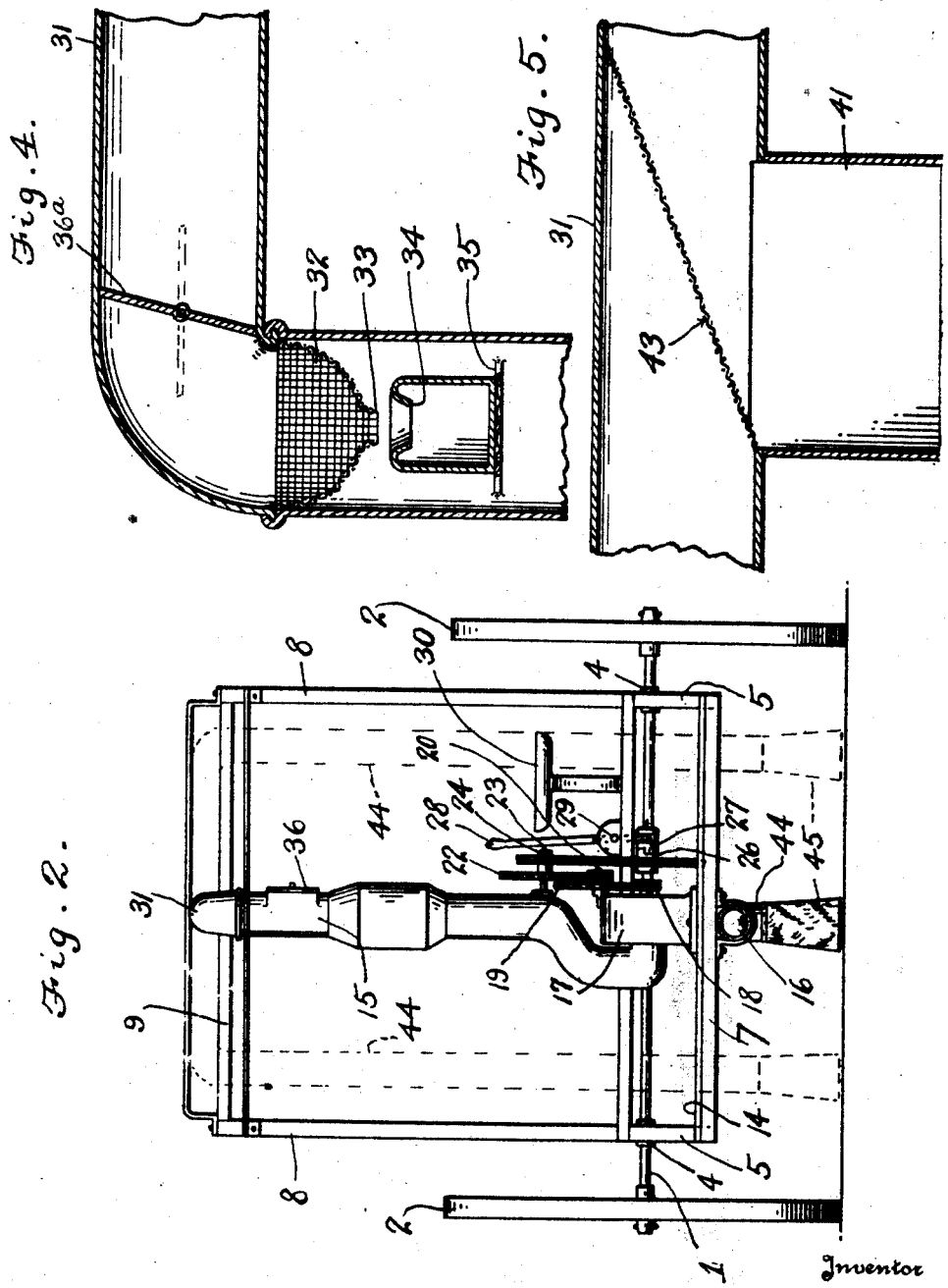

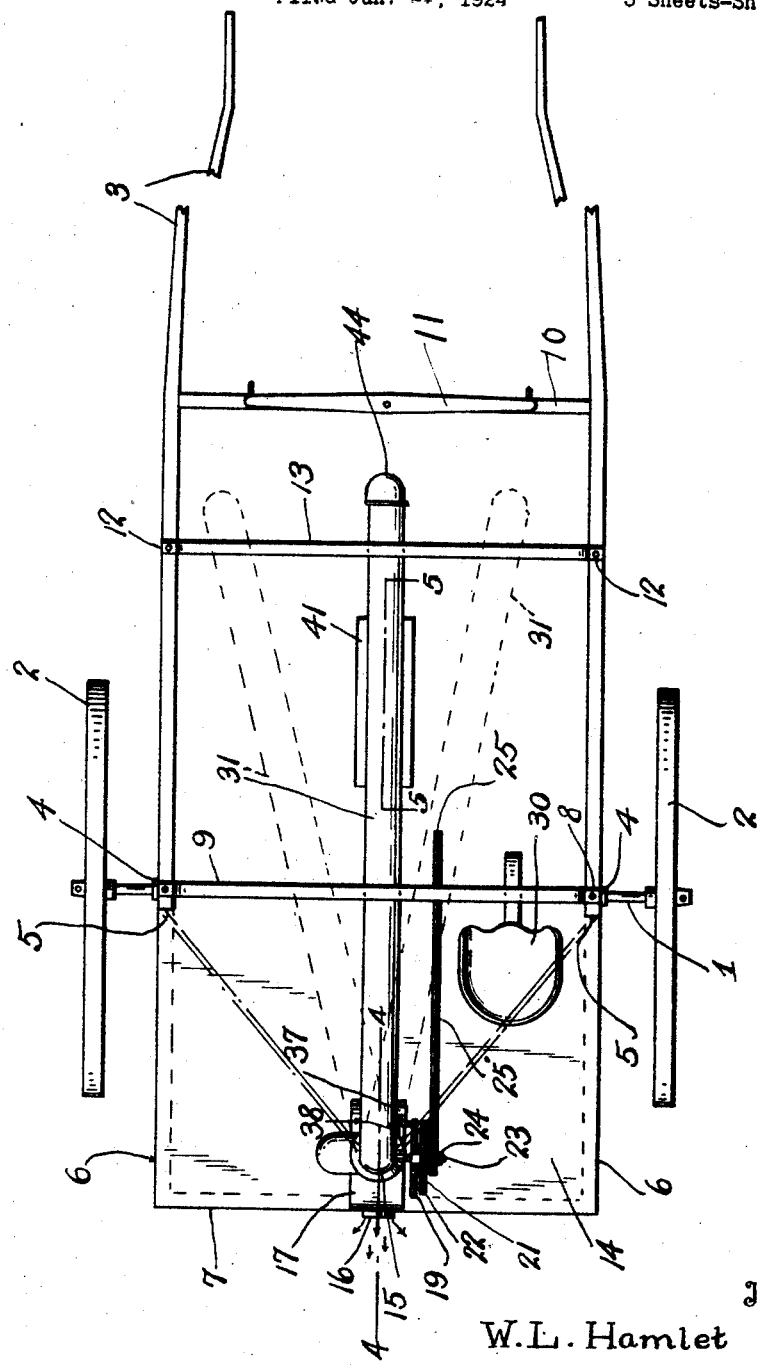

1,561,536

UNITED STATES PATENT OFFICE.

WILSON L. HAMLET, OF DAVISTON, ALABAMA.

WEEVIL COLLECTOR.

Application filed January 21, 1924. Serial No. 687,612.

*To all whom it may concern:*

Be it known that I, WILSON L. HAMLET, a citizen of the United States, residing at Daviston, in the county of Tallapoosa and State of Alabama, have invented new and useful Improvements in Weevil Collectors, of which the following is a specification.

An object of this invention is the production of a boll weevil destroyer in which the insects and broken squares are collected by suction and forced into suitable receptacles therefor on the travel of the device and on rows of cotton.

With the above broadly stated object in view, and many others which will appear as the nature of the invention is better understood, the invention further resides in the construction, combination and operative association of parts such as is set forth in the following description and disclosed by the accompanying drawings.

In the drawings:—

Figure 1 is a side elevation of my improvement.

Figure 2 is a rear elevation thereof.

Figure 3 is a top plan view thereof.

Figure 4 is a sectional view on the line 4—4 of Figure 3.

Figure 5 is a sectional view on the line 5—5 of Figure 3.

My improvement comprises a wheeled member and is preferably drawn by a single draft animal.

The improvement includes a revoluble axle 1 on whose ends there are keyed the drive wheels 2. The axle 1 is connected to the thills or shafts 3, for the draft animal, by boxings 4. The thills, to the rear of the axle are bent downwardly, as at 5 and extended rearwardly, as at 6, the elements 6 being connected by an outer bar 7. In a line with the depending portions 5 of the thills 3 there are uprights 8 connected by an upper element 9 and providing an inverted U-shaped frame. The thills are connected together by the usual bar 10 which carries the single tree 11 to which the draft animal is connected, and in a line with the bar 10 there are uprights 12 connected by a transverse upper member 13. This also provides a substantially U-shaped frame.

Between the rear elements 6 and 7 there may be a platform or other support 14 for an upwardly directed stack 15. The lower end of the stack has a reduced rearwardly extending curved pipe 16 that forms the air outlet for the stack. In the stack there is a suction fan 17, having its shaft mounted in suitable bearings and projecting through one side of the stack 15. On the projecting end of the shaft there is a pinion 18 which is in mesh with a gear 19. The gear 19 is mounted on a stub shaft 20 secured to the side of the stack and carries a pinion 21. The pinion 21 is in mesh with a gear 22 journaled on a stub shaft 23 and carrying a small sprocket wheel 24.

Loosely mounted on the axle 1, which is round in cross section, there is a comparatively large sprocket wheel 25, a sprocket chain 25' being trained around said wheel 25 and the sprocket wheel 24. Suitable means is provided for holding the sprocket wheel from moving longitudinally on the shaft. The sprocket wheel has one of the faces of its hub formed with a rack surface 26 that is engageable with a similar surface on a slidable clutch member 27. The clutch member 27 has its bore provided with a keyway for a key on the axle. The clutch member 27 is provided with a peripheral groove in which is received the forked end of a lever 28. The lever 28 is pivoted for side swinging movement on a suitable support 29, the said support being disposed to one side of a seat 30.

The improvement may be provided with a single seat 30 or with a seat in advance thereof should it be found necessary to employ two hands, one to operate the suction device and the other to drive the draft animal, but from practice, I have found that a single hand can successfully accomplish both of these purposes.

The stack 15 has preferably swivelly connected to its upper end a pipe member 31, the same resting upon the upper elements of the mentioned frames. The end of the pipe 31 that enters the stack 15 is foraminous and is funnel-shaped as indicated by the numeral 32. The spout of this funnel, indicated by the numeral 33 enters the inwardly flared mouth of a receptacle 34. The receptacle is suitably supported in the stack by means 35. The stack is provided with an opening that is normally closed by a latched door 36 disposed opposite the receptacle 34. If desired, there may be arranged in the receptacle a germicide or other insect destroyer.

The pipe 31, inward of its funnel-shaped end 32 has its passage controlled by a valve 36ᵃ, the same being operated by a suitable handle 37, and means 38 is provided for holding the valve in any desired position with respect to the bore of the pipe. The valve 36ᵃ may serve as a means for directing the insects into the funnel-shaped mouth 32 of the said pipe 31 and likewise regulates the draft through the said pipe.

The pipe 31, at the portion thereof resting between the frames is provided with an opening, and with longitudinally arranged guides 39 at the opposite edges thereof. The guides are designed to receive therein the flanges 40 on the upper and open end of a box 41. Suitable means 42 may be employed for latching the box to the pipe, and inward of the box there is arranged in the pipe 31 a reticulated member or screen 43.

One end of the pipe 31 projects a slight but suitable distance beyond the upper member 13 of the frame 12, and to this end there is connected a spout 44. The pipe is of a length to contact the ground to the sides of the row of plants, and has on its said lower end an outwardly flared mouth-piece or nozzle 45 preferably of leather. The pipe 44 may be slightly flexible and contacts with the inner wall of the cross piece 10 for the thills, so that the said pipe may be readily grasped by the operator and moved either independently of or with the pipe 31 to bring the mouth or nozzle 45 over the broken squares to cause the same to be sucked into the spouts 44 or 31 and to contact with the screen 43 to deposit the same in the box 41. The screen is of such mesh that the insects may pass therethrough, and the valve 36ᵃ may be opened to permit of the said insects passing through the funnel 32 into the receptacle 34.

When the slidable clutch is thrown into mesh with the fixed clutch on the wheel 26 and the vehicle is propelled, it will be apparent that incident to the high speed gearing between the shaft 1 and the shaft for the fan, the latter will be very rapidly rotated so that a strong suction will be exerted at the mouth 45 of the pipe 42, said suction being sufficient to draw into the device broken squares and insects. Because of the funnel 32 and the flared mouth 33 of the receptacle 34, liability of insects deposited into the said receptacle being sucked therefrom by the fan will be prevented, while air passing through the associated pipes will find an outlet through the reduced pipe section 16 which is connected to the stack 15.

It is believed that the foregoing description, when taken in connection with the drawings will fully set forth the construction and advantages of my improvement to those skilled in the art to which such inventions relate, but it is to be understood that I do not wish to be restricted to the precise structural details herein set forth and hold myself entitled to such departures therefrom as fairly fall within the scope of what I claim.

Having described the invention, I claim:—

In a suction boll weevil collector, a stack, a pipe having a foraminous funnel-shaped end which is swivelly received in the top of the stack, a receptacle in the stack below the said end of the pipe, said pipe having an opening in the bottom thereof, an angle screen in the pipe arranged over the opening, and a box providing a receptacle removably secured on the pipe and covering the opening.

In testimony whereof I affix my signature.

WILSON L. HAMLET.